UNITED STATES PATENT OFFICE.

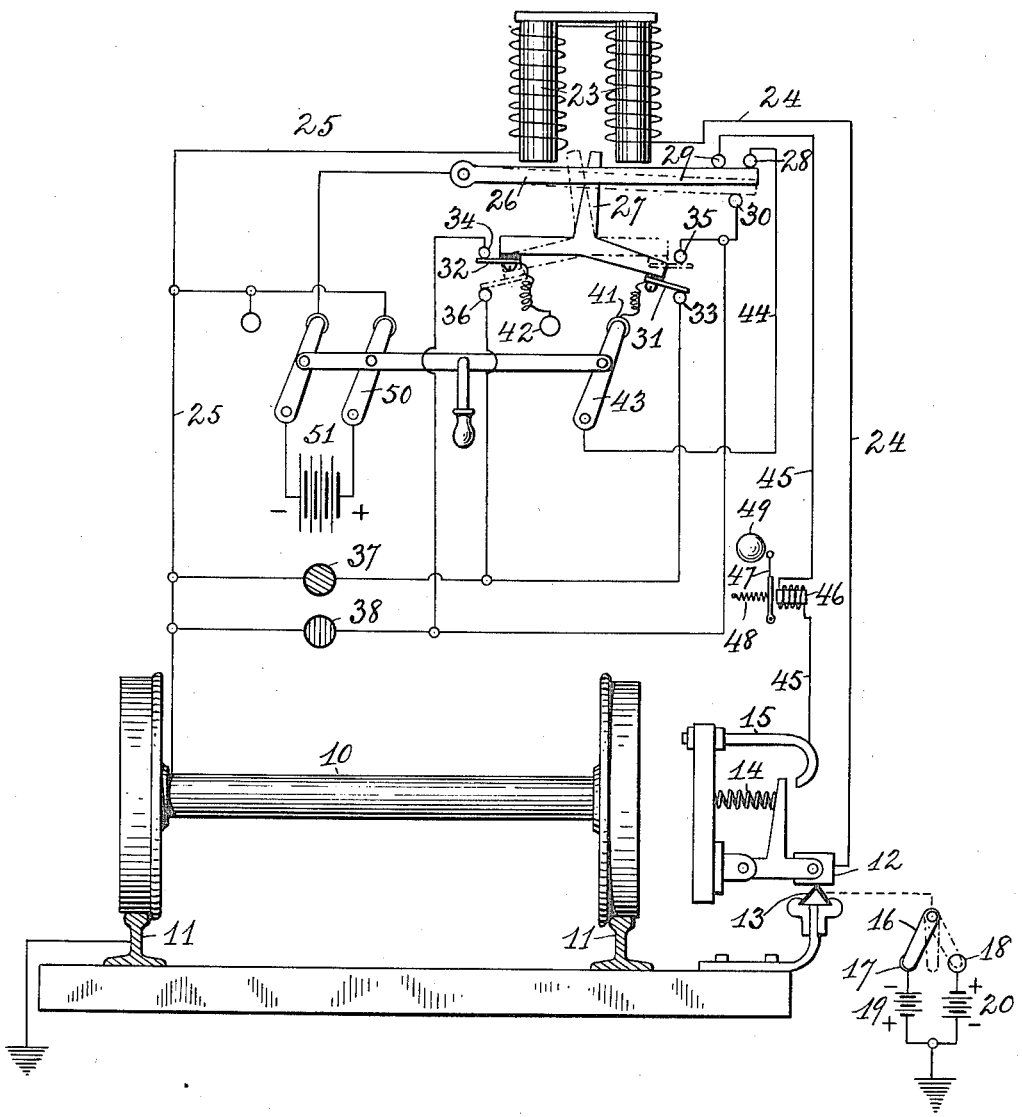

PAUL J. SIMMEN, OF INDIANAPOLIS, INDIANA.

RAILWAY SIGNAL SYSTEM.

1,239,048.

Specification of Letters Patent.

Patented Sept. 4, 1917.

Application filed September 26, 1913. Serial No. 791,939.

*To all whom it may concern:*

Be it known that I, PAUL J. SIMMEN, a citizen of the United States, residing at Indianapolis, in the county of Marion and State of Indiana, have invented certain new and useful Improvements in Railway Signal Systems, of which the following is a specification.

This invention relates to signals for moving vehicles adapted to advise the operator whether the conditions for proceeding are safe or dangerous.

The object of the invention is to provide a system whereby signals may be given to vehicles in such a manner that a signal intended to indicate one condition for one vehicle will indicate a different condition if received by another vehicle. In the described form of the invention, the signals are differently colored lights located within the range of vision of the operator in the cab. A particularly advantageous application of the system is where a single track road is used for traffic in both directions, and clear signals intended for vehicles moving in one direction will produce danger signals if received by vehicles moving in the opposite direction. For example, the present invention is peculiarly applicable in connection with or may be said to form a part of the system disclosed in co-pending application, Serial No. 791,451, filed Sept. 14, 1913.

In the drawings there is shown a preferred embodiment of the invention, the parts being displayed diagrammatically in order to promote clearness of understanding. In the drawings, 10 indicates the axle of a vehicle provided with wheels traveling on rails 11, which may be suitably grounded. The vehicle carries a yielding shoe 12 adapted to contact with a signal rail 13 against the tension of a spring 14 which presses it normally into engagement with an arm 15 also carried by the vehicle. There are a number of such signal rails arranged at suitable intervals along the way, and the shoe 12 is lifted when in contact therewith out of contact with the arm 15. These rails may be either electrically deënergized, or energized, positively or negatively with respect to the track rails 11, at will by means of a switch 16 movable into or out of engagement with either of the contact members 17 and 18 connected to opposite terminals of two batteries 19 and 20, the other terminals of which are grounded.

The vehicle carries an electro-magnet indicated at 23 which has one end of its winding connected by a wire 24 to the shoe 12 and the other end thereof grounded, for instance, by a wire 25 connected to the axle 10. The magnet 23 has a pivoted non-polarized armature 26 and a pivoted polarized armature 27. The position of the armature 26 depends wholly upon whether or not the electro-magnet 23 is energized, regardless of the direction of the flow of current in its winding, such armature being moved to its upper, or full line, position and into engagement with contact members 28 and 29 when the magnet is energized and dropping to its lower or dotted line, position and into engagement with a contact member 30 when the magnet is deënergized. The position of the polarized armature 27 depends upon the direction of flow of the current through the magnet. It is moved to one position, shown in full line, when the current flows in one direction, and to another position, shown in dotted line, when the current flows in the opposite direction, remaining in either position in which it happens to be when the magnet becomes deënergized. It carries a pair of oppositely arranged arms provided with fingers 31 and 32, which engage contact members 33 and 34 when it is in the full line position, and contact members 35 and 36 when it is in the dotted line position.

The contacts 33 and 36 are connected with each other and with one terminal of a "clear" signal lamp 37 conventionally of a green color, and the contacts 30, 35 and 34 are connected with each other and with one side of a "danger" signal lamp 38, conventionally of a red color. The other terminals of the lamps 37 and 38 are connected to the wire 25. The fingers 31 and 32 are adapted to connect with members 41 and 42 with either of which a switch arm 43 may be moved into engagement, this arm being connected in turn by a wire 44 to the member 28. The member 29 is connected to the arm 15 by a wire 45 which includes the coil of an electro-magnet 46 having an armature 47 drawn away from the magnet by a spring 48 and which is arranged in a usual manner to tap a bell 49 when the magnet 46 becomes deenergized. The armature 26 and the wire 25 are connected through a reversing switch 50 to the two sides of a local battery 51 carried on the vehicle. This switch 50 and the switch 43 are operated together by a common handle indicated at 52.

The operation of the device is as follows: Assuming that the signal rail 13 is negatively energized with respect to the track rails 11, by reason of the fact that the switch 16 is in contact with the member 17, when the vehicle reaches this rail 13 its shoe 12 is lifted to the position shown in the drawing and a current passes from the positive side of the battery 19 through the earth and the rails 11 to the axle 10, thence through the wire 25, the magnet 23, the wire 24 to the shoe 12, the rail 13, the switch 16, and the member 17 to the negative side of the battery 19. The resultant energization of the magnet 23 lifts the armature 26 to its full line position (if it is not already lifted) and moves the armature 27 to the full line position (if it is not already in such position). The switches 43 and 50 being in the position shown in the drawing, a current passes from the positive side of the battery 51 through one arm of the reversing switch 50, the wire 25, the green lamp 37, the contact 33, the finger 31, the contact 41, the switch arm 43, the wire 44, the contact 28, the armature 26, and the other arm of the reversing switch 50 to the negative side of the battery 51, and the lamp 37 is lighted and gives a clear signal to the operator, which light and signal continues after the train passes beyond the signal rail 13, and the shoe 12 drops and engages the arm 15 because the armatures 26 and 27 are held to their positions (shown in full line) by the continued energization of the magnet 23 with the same polarity as before through the current from the battery 51, which current passes from the positive side of such battery through one arm of the switch 50, the wire 25, the magnet 23, the wire 24, the shoe 12, the arm 15, the magnet 46, the wire 45, the contact 29, the armature 26, and the other arm of the switch 50 to the negative side of the battery 51. In other words, although the impulse through the signal rails 13 is intermittent as they are arranged in succession along the track, the indication of the clear signal is continuous.

If the signal rail 13 is deënergized when the shoe 12 passes over it because the switch 16 is in its middle position, there results a deënergization of the magnet 23, for the local circuit through the battery 51 is broken by the separation of the shoe 12 from the arm 15 and there is no current to take its place from either the battery 19 or the battery 20. Consequently, the armature 26 drops to the position indicated in dotted line on the drawing and closes a circuit from the positive side of the battery 51, through one arm of the switch 50, the wire 25, the red lamp 38, the contact 30, the armature 26, and the other arm of the switch 50 to the negative side of the battery 51, and the lamp 38 glows and gives a danger signal to the operator, on seeing which he should stop his train and take such steps as are necessary for protection. Furthermore, his attention is called to the possibility of a change in signals when the signal rail is reached by the shoe 12 by the sounding of the bell 49 upon the deënergization of the magnet 46 which results from the separation of the shoe 12 from the arm 15. If the vehicle does not stop with the shoe 12 on the rail 13, but proceeds beyond such rail, the reëngagement of the shoe 12 with the contact arm 15 does not reëstablish the local circuit from the magnet 23, because such circuit is broken by the disengagement of the contact 29 and armature 26, and the latter remains in engagement with the contact 30. Therefore, the danger signal persists after the passage of the vehicle beyond the deënergized signal rail. In other words, in this case also there is a continuous signal indication from an intermittent impulse.

If the rail 13 is positively energized with respect to the track rails 11, by reason of the fact that the switch 16 is in engagement with the member 18, the contact of the shoe 12 with such rail closes a circuit from the positive side of the battery 20 through the member 18, the switch 16, the rail 13, the shoe 12, the wire 24, the magnet 23, the wire 25, the axle 10, and the rails 11 to the negative side of the battery 20. The resultant energization of the magnet 23 is in the reverse direction from that produced when the rail 13 was negatively energized, and lifts, or holds lifted, the armature 26 to the position indicated in full line in the drawing and moves the armature 27 to the position indicated in dotted lines in the drawing and breaks the circuit for the green lamp 37 (assuming that such circuit has theretofore been established), and establishes a circuit for the red lamp 38, from the positive side of the battery 51 through one arm of the switch 50, the wire 25, the red lamp 38, the contact 35, the finger 31, the contact 41, the switch arm 43, the contact 28, the armature 26, and the other arm of the reversing switch 50 to the negative side of the battery 51. Thus with the switches 43 and 50 in the position shown in the drawing, the positive energization of the rail 13 produces a danger signal, upon receiving which the operator should stop. His attention is also called to the danger signal by the tapping of the bell 49 which takes place whenever the shoe 12 engages the rail 13 if the magnet 23 is energized when such engagement takes place (or in other words, if there is a possibility of a change of signals to "danger").

If the operator does not stop, but proceeds beyond the rail 13, the shoe 12 reëngages the arm 15 because of the action of the spring 14 pressing it against such arm. In the practical operation of the apparatus the parts are so arranged that on account of the usual ramp of the signal rail 13 there occurs a momentary practically simultaneous engagement of the shoe 12 with both the rail 13 and the arm 15, which connects the batteries 20 and 51 in series by a circuit passing from the positive side of the battery 20 through the member 18, the switch 16, the rail 13, the shoe 12, the arm 15, the wire 45, the contact 29, the armature 26, one arm of the reversing switch 50, the battery 51, the other arm of the reversing switch 50, the wire 25, the axle 10, and the rails 11, to the negative side of the battery 20, which circuit does not include the magnet 23 thereby causing a short circuit around 23 and deënergizing 23 sufficiently to allow the armature 26 to drop out of engagement with contacts 28 and 29 and into engagement with the contact 30. However, if the momentarily simultaneous engagement of the shoe 12 with the rail 13 and the contact finger 14 does not take place, as may sometimes happen, the circuit for energizing the magnet 23 from the battery 20 is broken before that for energizing it from the battery 51 is established, and the magnet 23 is thus de-magnetized sufficiently long to allow the armature 26 to drop, as aforesaid. Even in case the disengagement of the shoe 12 from the rail 13 should occur exactly simultaneously with its engagement with the arm 15, if that is possible, the resultant reversal of current in the winding of the magnet 23 produces a momentary de-magnetization of the latter which causes the armature 26 to drop, as aforesaid, and the de-magnetization to continue because of the dropping of the armature. Thus, in any case, as the shoe 12 passes off the positively energized rail 13 the armature 26 drops into engagement with the member 30, which prevents the re-magnetization of the magnet 23 by the local battery 51, and also completes another circuit for the red lamp 38 from the positive side of the battery 51 through one arm of the switch 50, the wire 25, the lamp 38, the contact 30, the armature 26, and the other arm of the reversing switch 50 to the negative side of the battery 51.

Thus the danger signal produced by the engagement of the shoe 12 with a positively energized rail 13 produces a danger signal through one circuit while the shoe remains in contact with such rail and maintains such danger signal through another circuit as the shoe passes out of such contact.

According to the foregoing, the negative energization of the rail 13 produces a "clear" signal, and the deënergization or the positive energization of the rail 13 produces a danger signal. By moving the handle 52 to the left and thus throwing the switches 43 and 50 to their other positions, the connections are changed so that the positive energization of the rail 13 will produce a "clear" signal and its deënergization or negative energization a "danger" signal. In such a case, the circuits are the same as before except that the currents will flow in the opposite direction and the contact finger 32 and the contacts 34 and 36 will take the place of the contact finger 31 and the contacts 35 and 33, respectively.

Supposing then that there are two vehicles on the same track and on one vehicle the switches 50 and 43 are in the position shown in the diagram, and on the other vehicle they are in the opposite position. It is obvious that either the positive or negative energization of the signal rails 13 along the way through the current flowing over a single wire will cause a clear signal to be indicated on the one vehicle and a danger signal to be indicated on the other vehicle and vice versa, and this irrespective of the direction in which the vehicles may be moving, and that the deënergization of such rails will cause a danger signal to be displayed on both vehicles. In other words the change in the polarity of the current passing over the single wire to the signal rails accomplishes through the described system the same purpose that has heretofore been possible only by the use of more than one wire.

I claim as my invention:

1. In a signal system for a vehicle moving along a trackway, two signals, a source of electrical current and two armatures on the vehicle, an electromagnet for the armatures, one of said armatures being neutral and the other polarized, a normally closed circuit on the vehicle including the neutral armature, means for intermittently interrupting said circuit during the passage of the vehicle along the trackway, means for maintaining the circuit broken when once so interrupted, and an outside source of electrical energy which is adapted to energize the magnet controlling the polarized armature in either of two ways.

2. A signal system for a vehicle comprising two signals located thereon, two electromagnetically operated devices jointly controlling said signals, one of said devices being polarized and the other non-polarized, a normally closed holding circuit on the vehicle including the non-polarized device, means along the path of the vehicle energizable positively or negatively and deënergizable to control said devices, and an audible signal which is automatically actuated when the vehicle passes said means if the holding circuit becomes deënergized thereby.

3. A signal system for a vehicle comprising two separately operable signals, electrically operated means for operating either signal including electro-magnetic means having a neutral and a polarized armature, means for energizing the electro-magnetic means in either of two directions to cause the operation of either signal, a normally closed circuit including the neutral armature, and means for maintaining the circuit broken if once interrupted.

4. A signal system for a vehicle comprising two independent signals, electro-magnetic means having a polarized and a neutral armature, and devices operated by the electro-magnetic means accordingly as it is energized in opposite directions to effect the operations of the different signals, a normally closed circuit including a neutral armature, and means for maintaining the circuit broken if once interrupted regardless of any condition or change of condition on the vehicle itself.

5. A signal system for a vehicle comprising a plurality of signals independent of each other, electrical means for actuating the same including a normally closed circuit, a non-polarized device controlling the circuit, means for maintaining the circuit broken if once interrupted and deënergized until reënergized, and mechanism including means along the trackway independent of the traction rails for controlling the circuit.

6. In a signal system for a vehicle moving along a trackway, a signal, a source of electrical current and two armatures on the vehicle, one armature being neutral and the other polarized, a normally closed circuit on the vehicle including the neutral armature and the signal, means including elements independent of the traction rails for intermittently interrupting the normally closed circuit as the vehicle moves along the trackway, said neutral armature and a contact with which it coöperates constituting means on the vehicle for maintaining the circuit broken when so interrupted.

7. A signal system for a vehicle comprising a signal, electrical means for actuating the same including a normally closed circuit, a non-polarized device controlling the circuit, an electromagnet for operating both devices, and means for maintaining the circuit broken if once interrupted and deënergized and until reënergized.

8. A system for controlling the movement of vehicles on a track comprising wayside contact means, means for electrically energizing such contact means in either direction, two signals on a car, means including an electro-magnet for operating such signals by impulse received from the contact means, means adapted to operate one signal or the other as such contact means are energized in one direction or the other, in combination with means for automatically continuing the operation of either signal after the car has passed the contact means, from which it has received an electrical impulse, including a neutral armature for the electro-magnet and a contact therefor.

9. A signal system for railways, comprising on the car electro-magnetic means provided with a polarized armature and a non-polarized armature, a signal, means associated with the armatures and signal whereby the signal is made operative when the non-polarized armature is in one position and also when the non-polarized armature is in the other position and the polarized armature is in one position, means along the track for controlling the energization and direction of energization of the electro-magnetic means, a double throw switch, means associated with the switch and polarized armature whereby the signal is made operative when the switch is in either position, and means including a source of electric energy on the car for maintaining the energization of the electro-magnetic means in the same direction after the means along the track has been passed by the car.

10. A signal system for railways, comprising on the car an electro-magnet provided with a polarized armature and a non-polarized armature, a signal, means associated with the armatures and signal whereby the signal is made operative when the non-polarized armature is in one position and also when the non-polarized armature is in the other position, and the polarized armature is in one position, means along the track for controlling the energization and direction of energization of the magnet, a double throw switch, means associated with the switch and polarized armature whereby the signal is made operative when the switch is in either position, and means including a source of electric energy on the car for maintaining the energization of the magnet in the same direction after the means along the track have been passed by the car, and means for reversing the connection of said source of electric energy to the magnet.

11. A signal system for railways, comprising on the car an electro-magnet, provided with a polarized armature and a non-polarized armature, a signal, means associated with the armatures and signal whereby the signal is made operative when the non-polarized armature is in one position and also when the non-polarized armature is in the other position and the polarized armature is in one position, and means along the track for controlling the energization and direction of energization of the magnet.

12. A signal system for railways, comprising electro-magnetic means, a polarized armature and a non-polarized armature moved thereby, an electrically operated signal made operative only when both armatures are in predetermined positions, means along the track for controlling the energization and direction of energization of the electro-magnetic means, and a source of electric energy carried by the car for maintaining the energization of the electro-magnetic means after the means along the track has been passed by the car when such maintenance of energization is of the same polarity as that of the means along the track.

13. In a signal system for a vehicle moving along a trackway a normally closed circuit on the vehicle including a source of electric energy and an electro-magnet, means along the trackway including an outside source of electric energy for intermittently energizing the electro-magnet in either of two directions, and means for breaking the circuit, and also for maintaining the circuit broken after the vehicle has passed the means along the trackway, when said outside source of electric energy is in opposition to the vehicle carried source of energy.

14. In a signal system for a vehicle moving along a trackway, a normally closed circuit on the vehicle including a source of electric energy and an electro-magnet, means including devices along the trackway for intermittently breaking the circuit, said means including an outside source of electric energy for intermittently energizing the electro-magnet in either of two directions, and means for maintaining the circuit broken after the vehicle has passed the means along the trackway, when said outside source of electric energy is in opposition to the vehicle carried source of energy.

15. A signal system for a vehicle comprising a signal, electrical means for actuating the same including a normally closed circuit, a polarized and a non-polarized device controlling the circuit, electro-magnetic means for operating both devices, means for maintaining the circuit broken if once interrupted, and means outside the vehicle for automatically restoring the circuit to its closed condition.

16. A signal system for a vehicle comprising a signal, electrical means for actuating the same including a normally closed circuit, a non-polarized device controlling the circuit, electro-magnetic means for operating the device, means including trackside mechanism for periodically interrupting the circuit and either creating a new circuit including the same or leaving it open, means for maintaining the circuit broken if thus left open, and means outside the vehicle for automatically restoring the circuit to its closed condition.

17. In a signal system for a vehicle moving along a trackway, a normally closed circuit on the vehicle including a source of electric energy and electro-magnetic means, two armatures controlled by said electro-magnetic means, one being neutral and the other polarized, means for intermittently interrupting said circuit during the passage of the vehicle along the trackway, means for maintaining the circuit broken when so interrupted, an outside source of electric energy to place the neutral armature in one position and the polarized armature in either of two positions, and secondary electric circuits controlled by the neutral and polarized armatures.

18. In a signal system for a vehicle moving along a trackway, a normally closed circuit on the vehicle including a source of electric energy and electromagnetic means, two armatures controlled by said electro-magnetic means, one being neutral and the other polarized, means for intermittently interrupting said circuit during the passage of the vehicle along the trackway, means for maintaining the circuit broken when so interrupted, an outside source of electric energy to energize the electro-magnetic means in either of two directions, and secondary electric circuits controlled by the neutral and polarized armatures.

19. A system of the character set forth, including a vehicle, a normally closed circuit on the vehicle, devices operated by currents of different polarity in said circuit and by the breaking of the circuit, mechanism including trackside means for intermittently interrupting the circuit and supplying thereto current of different polarities while so interrupted, and means included in the circuit for controlling it and maintaining it open when interrupted by the trackside means and as long as no current is supplied thereto by such means.

20. A system of the character set forth, including a vehicle, a normally closed circuit on the vehicle, devices operated by currents of different polarity in said circuit and by the breaking of the circuit, and mechanism including trackside means for intermittently interrupting the circuit and supplying thereto current of different polarities while so interrupted, or supplying no current thereto, means for reëstablishing and maintaining the closed circuit in the interims between such interruptions when current of either polarity has been thus supplied, and means for maintaining the circuit broken when no current has been supplied by the trackside means until such current is again supplied.

21. The combination with a vehicle movable along a trackway, of a controlling vehicle circuit, electro-magnetic means in said circuit, an armature controlled by said electro-magnetic means and controlling the said vehicle circuit, means for intermittently interrupting the circuit as the car moves along the trackway, to permit its deënergization, means along the trackway for causing a current of either polarity to pass through the circuit when so interrupted, or for leaving it deënergized, a plurality of electrically operated devices, and means controlled by said circuit for effecting the operation of one device when a current of one polarity is passed through said circuit and for effecting the operation of a second device when a current of opposite polarity is passed therethrough or when the circuit is deënergized.

22. The combination with a vehicle movable along a trackway, of a controlling vehicle circuit, electro-magnetic means in said circuit, an armature controlled by said electro-magnetic means and controlling the vehicle circuit, means for intermittently interrupting the circuit as the car moves along the trackway, to permit its deënergization, means along the trackway for effecting a varied energization of the circuit when so interrupted, and a plurality of signaling devices controlled by said controlling circuit and adapted to be selectively operated by the character of the energization or by the deënergization of the circuit when interrupted.

23. The combination with a vehicle movable along a trackway, of a controlling vehicle circuit, electro-magnetic means in said circuit, an armature controlled by the said electro-magnetic means and controlling the circuit, means for intermittently interrupting the circuit as the car moves along the trackway to permit its deënergization, means along the trackway for causing a current of either polarity to pass through the circuit when so interrupted, or for leaving it deënergized a plurality of electrically operated devices, and circuits for the devices controlled by the aforesaid armature for selectively operating the same according to the polarity of the current passed therethrough or the lack of a current.

24. The combination with a vehicle movable along a trackway, of a controlling vehicle circuit, electro-magnetic means in said circuit, a neutral armature controlled by said electromagnetic means and controlling the vehicle circuit, a polarized armature controlled by said electro-magnetic means, means for intermittently interrupting the circuit as the car moves along the trackway, to permit the deënergization of said circuit, means along the trackway for causing a current of either polarity to pass through the circuit when so interrupted or for leaving said circuit deënergized, a plurality of electrically operated devices, and circuits for said devices, said circuits being alternately closed by the polarized armature when shifted by currents of opposite polarity in the vehicle circuit, and said circuits being also controlled by the neutral armature.

25. The combination with a vehicle movable along a trackway, of a controlling vehicle circuit, mechanism including means along the trackway for intermittently interrupting the circuit to permit its deënergization, means for energizing the circuit when so interrupted or leaving it deënergized, means on the vehicle controlled by the energization or deënergization of said vehicle circuit for controlling said vehicle circuit, and traffic controlling means controlled by said vehicle circuit.

26. The combination with a vehicle movable along a trackway, of a controlling vehicle circuit, mechanism including means along the trackway for intermittently interrupting the circuit to permit its deënergization, means for energizing the circuit by a current of either polarity or leaving it deënergized when so interrupted, means on the vehicle controlled by the energization or deënergization of the vehicle circuit for controlling said vehicle circuit, and traffic controlling devices respectively controlled by currents of either polarity flowing through the vehicle circuit and by the deënergization of said circuit.

27. The combination with a vehicle movable along a trackway, of a controlling vehicle circuit on the vehicle, mechanism including means along the trackway for intermittently interrupting the circuit to permit its deënergization, means in the vehicle circuit and controlled thereby for also interrupting said circuit when deënergized by interruptions along the trackway, means for energizing said vehicle circuit along the trackway when interrupted, and traffic controlling means controlled by said vehicle circuit.

In testimony whereof I affix my signature in presence of two witnesses.

PAUL J. SIMMEN.

Witnesses:
R. H. MOORE,
CLARENCE GUSCATT.